(12) United States Patent  
Schaffa et al.

(10) Patent No.: US 8,819,258 B2  
(45) Date of Patent: Aug. 26, 2014

(54) ARCHITECTURE FOR BUILDING MULTI-MEDIA STREAMING APPLICATIONS

(75) Inventors: Frank Andre Schaffa, Hartsdale, NY (US); Peter Hans Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 12/436,951

(22) Filed: May 7, 2009

(65) Prior Publication Data

US 2010/0287295 A1 Nov. 11, 2010

(51) Int. Cl.  
*G06F 15/16* (2006.01)

(52) U.S. Cl.  
USPC ............ 709/231; 709/230; 709/202; 709/206

(58) Field of Classification Search  
CPC ... H04L 1/0002; H04L 1/0003; H04L 1/0006; H04L 1/004; H04L 1/0047; H04L 1/0079  
USPC .................................. 709/230, 231, 202, 206  
See application file for complete search history.

(56) References Cited

U.S. PATENT DOCUMENTS

| 5,544,297 | A * | 8/1996 | Milne et al. .................... 715/201 |
| 5,636,211 | A | 6/1997 | Newlin et al. |
| 5,671,225 | A * | 9/1997 | Hooper et al. ................ 370/468 |
| 6,934,954 | B1 | 8/2005 | Crites et al. |
| 7,386,641 | B2 * | 6/2008 | Xu et al. ......................... 710/19 |
| 2001/0023392 | A1 * | 9/2001 | Nakatsuhama et al. ...... 702/120 |
| 2001/0034786 | A1 | 10/2001 | Baumeister et al. |
| 2002/0070960 | A1 * | 6/2002 | Maine et al. .................... 345/723 |
| 2002/0126201 | A1 * | 9/2002 | Schmitt et al. ............. 348/14.09 |
| 2003/0200336 | A1 | 10/2003 | Pal et al. |
| 2004/0240427 | A1 * | 12/2004 | Kohli et al. .................... 370/351 |
| 2008/0005349 | A1 | 1/2008 | Li et al. |
| 2008/0201716 | A1 * | 8/2008 | Du et al. ......................... 718/104 |
| 2009/0022072 | A1 * | 1/2009 | Zhu et al. ....................... 370/260 |
| 2009/0164655 | A1 * | 6/2009 | Pettersson et al. ............. 709/231 |
| 2010/0223392 | A1 * | 9/2010 | Pond et al. ..................... 709/231 |

OTHER PUBLICATIONS

Chon, et al. An Application-Independent Multimedia Adaptation Framework for the Mobile Web. Computational Science and Its Applications—ICCSA 2006. International Conference May 8-11, 2006. Proceedings, Part II (Lecture Notes in Computer Science), vol. 3981. Workshop on Information Systems and Information Technologies. pp. 28-39. (15 pages).

(Continued)

*Primary Examiner* — Lan-Dai T Truong  
(74) *Attorney, Agent, or Firm* — Tutunjian & Bitetto, P.C.; Preston Young

(57) ABSTRACT

A streaming engine and method includes a plurality of input types configured to pass one of samples and frames from an input stream. A processing block is configured to process the samples and frames independently of input and output types and produce any kind of output samples and frames in accordance with processing elements employed in the processing block. A plurality of output types is configured to initiate a session which determines connections between inputs and outputs so that the samples and the frames are received from the processing block in accordance with the session to appropriately direct the stream.

25 Claims, 7 Drawing Sheets

(56) References Cited

OTHER PUBLICATIONS

Hutter, et al. Automatic Adaptation of Streaming Multimedia Content in a Dynamic and Distributed Environment. 2005 IEEE. Image Processing, ICIP 2005. IEEE International Conference. vol. 3, Issue , 11-14. Sep. 2005. http://www-itec.uni-klu.ac.at/publications/mmc/icip2005distributedadaptation.pdf (4 pages).

Nijhuis, et al. Supporting Reconfigurable Parallel Multimedia Applications. Euro-Par 2006, Parallel Processing, International Euro-Par Conference, 12th. Proceedings (Lecture Notes in Computer Science). vol. 4128. Aug. 28-Sep. 1, 2006. pp. 765-776. (10 pages).

Szwabe, et al. Dynamic Multimedia Stream Adaptation and Rate Control for Heterogeneous Networks. Journal of Zhejiang University Science A. Dec. 2005. pp. 63-69. (7 pages).

Thomas-Kerr, et al. Enhancing Interoperability Via Generic Multimedia Syntax Translation. 2006 IEEE. Proceedings of the Second International Conference Automated Production of Cross Media Content for Multi-Channel Distribution. (AXMEDIS '06). Dec. 2006, pp. 85-92. (6 pages).

\* cited by examiner

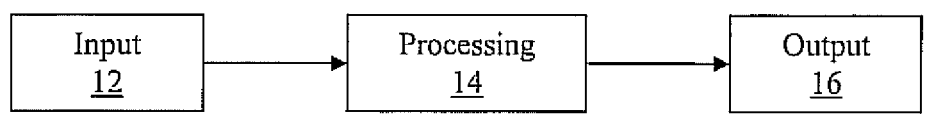
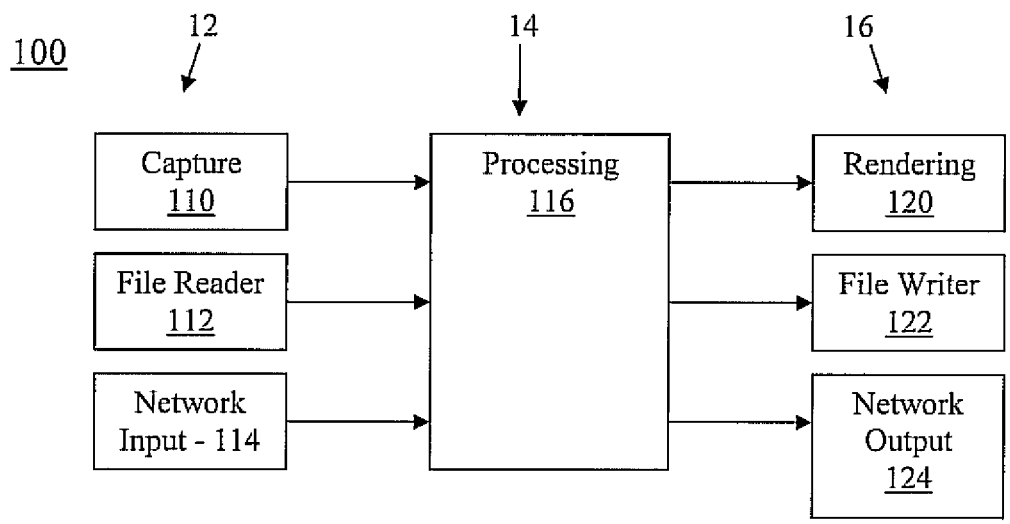
FIG. 1
FIG. 2

ARCHITECTURE FOR BUILDING MULTI-MEDIA STREAMING APPLICATIONS

BACKGROUND

1. Technical Field

The present invention relates to multi-media devices and more particularly to systems and methods for providing a common streaming application architecture for use with different types of streaming applications and devices.

2. Description of the Related Art

In recent years multi-media has become pervasive on personal computers and other hardware devices. The most widespread multi-media application that almost all computer users are familiar with is the so-called "player". Some of the most well-known players include the FLASH™ Player, the WINDOWS MEDIA™ Player, and the QUICKTIME™ Player. These players typically are capable of playing local multi-media files, but also are able to connect over a network to a server to receive a streamed multi-media presentation. The server that the player connects to in the latter case is another example of a multi-media application. Besides Video-On-Demand (VOD), i.e., serving stored files, these multi-media servers sometimes capture a live source such as from a camera or capture card and encode and stream this to connected players. Other, more dedicated "live servers" are implemented, for example, on so-called "IP-cameras", which are typically used in surveillance applications. Multi-media servers may also be cascaded to realize scalability with respect to the number of users that can be connected to a live multi-media presentation.

These and other conceivable multi-media applications are typically dedicated programs that may share some of the underlying software. For example, a server that can be cascaded could use the same software for network input as a player would use. This modularity of the software has great advantages with respect to manageability of maintenance of the software, but more often than not, the application itself contains dedicated software to tie the various modules together to make up the specific application functionality.

SUMMARY

A streaming engine and method include a plurality of input types configured to pass one of samples and frames from an input stream. A processing block is configured to process the samples and frames independently of input and output types and produce any kind of output samples and frames in accordance with processing elements employed in the processing block. A plurality of output types is configured to initiate a session which determines connections between inputs and outputs so that the samples and the frames are received from the processing block in accordance with the session to appropriately direct the stream.

A device having a streaming engine stored in memory includes an application programming interface (API) stored in the memory and having a control and management layer for configuring and maintaining the streaming engine. The API is capable of configuring the streaming engine in accordance with a given application. The streaming engine includes a plurality of input types configured to pass one of samples and frames from an input stream; a processing block configured to process the samples and frames independently of input and output types and produce any kind of output samples and frames in accordance with processing elements employed in the processing block; and a plurality of output types configured to initiate a session which determines connections between inputs and outputs so that the samples and the frames are received from the processing block in accordance with the session to appropriately direct the stream.

A method for integrating multi-media streaming applications on a computer device includes configuring one or more of inputs, outputs, processing elements and sample types for a streaming engine for a given application stored on a memory device; initiating a session based on outputs of the streaming engine to determine connections between inputs and the outputs so that the samples and the frames are appropriately directed; processing the samples and frames independently of input and output types to produce any kind of output samples and frames in accordance with processing elements employed in a processing block; and outputting the stream from the streaming engine.

These and other features and advantages will become apparent from the following detailed description of illustrative embodiments thereof which is to be read in connection with the accompanying drawings.

BRIEF DESCRIPTION OF DRAWINGS

The disclosure will provide details in the following description of preferred embodiments with reference to the following figures wherein:

FIG. 1 is a block/flow diagram showing a general structure for a streaming engine in accordance with one illustrative embodiment;

FIG. 2 is a block/flow diagram showing a three input type and three output type structure for a streaming engine in accordance with another illustrative embodiment;

DETAILED DESCRIPTION OF PREFERRED EMBODIMENTS

Figure 3:
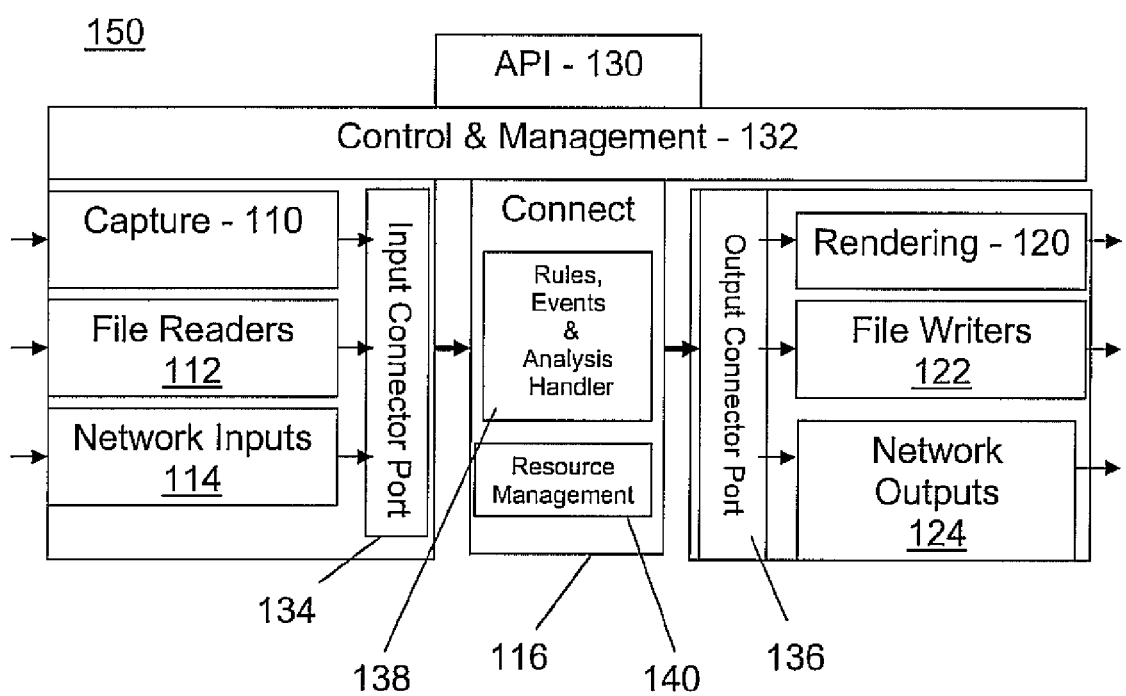
FIG. 3 is a block/flow diagram showing a system for providing a streaming engine in accordance with another illustrative embodiment.

In accordance with the present principles, a general architecture is provided that fits any multi-media application, including but not limited to FLASH™ players, QUICKTIME™ players, or any other multimedia player. The architecture provides a plurality of advantages. For example, only a single piece of software needs to be maintained, updated, debugged, etc. Multi-media applications can be built on top of this architecture without the need to know intricate details of streaming, multi-media encoding, etc. In accordance with the present principles, it will be easier to build new applications that otherwise would take a great amount of effort and dedication.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a general streaming application architecture 10 is depicted in accordance with an illustrative embodiment. When observing the architecture 10 of a streaming application, be it live capture, video-on-demand (VOD) serving, playback, or other application, all have a same general structure in common. For example, a player that is playing back from a local file has a local file reader as input 12, decoders as processing units 14, and a renderer as output 16. Likewise, an Internet Protocol (IP) camera has capture for input 12, encoding for processing 14, while the output 16 is a network output that, for example, uses the Internet Engineering Task Force (IETF) protocols such as real-time protocol (RTP), real-time streaming protocol (RTSP), session description protocol (SDP), etc. This generalization can be fitted into any existing multi-media streaming application.

Referring to FIG. 2, the general structure of FIG. 1 is shown in greater detail for a particular instance in accordance with the present principles. If the input 12 is further specified, a number of types of input, for example, capture 110, local file reading 112, and network input 114 are distinguished. It should be understood that other types of inputs may also be employed, and any number of inputs may be present. In one example, an additional input type may include data provided from an encapsulating program. Likewise, the output can be subdivided into a number of types, for example, rendering 120, file writing 122, and network output 124. It should be understood that other types of outputs may also be employed, and any number of outputs may be present. In one example, an additional output type may include data provided to a program, a printer, or other device or module.

A processing block 116 or middle portion connects the inputs 110, 112, 114 to the outputs 120, 122, 124. Multiple outputs can be connected to a single input, such as is the case with, for example, a live multi-media stream that multiple network clients can connect to. In case of, for example, VOD streaming or local file playback there is only one output connected to one input. It is also possible to combine multiple inputs and connect that combination to one or more outputs.

The connection between inputs 110, 112, 114 and outputs 120, 122, 124 is run via one or more processing elements 116. Processing elements 116 may include encoders and decoders, where, for example, decoders are employed to connect a network input to a rendering output. Examples of other processing elements include video down-sampling devices, speech-to-text conversion devices, text-to-speech devices, face recognition devices, etc.

By defining a certain data format between inputs, processing, and outputs, it is possible to create new and/or custom inputs 12, processing elements 14, and outputs 16. This makes the architecture 10 extensible and configurable.

Architectural details for single-user and multi-user sessions will now be described. A "session" can either be an input or multiple inputs connected to a single output or an input or multiple inputs connected to multiple outputs. The single output may include e.g., a Video-On-Demand (VOD) output, while the multiple-output may include a live output. VOD sessions usually support pause, seek, rewind, and possibly speed changes. A live session may have no control, but may alternatively be implemented with a large history buffer that can read out at any point, thus realizing seek capabilities into the past.

Live Session Registration: A live session is registered under a certain name before connection can be made to the live session. The registered name can be kept in a list, so that users can find the name when the names are requested. For performance reasons, registered inputs are active until an output requests connection to it. That means that upon registration a capture input does not yet capture and produce samples, and a network input does not yet connect over the network to receive samples.

Input-Output Connection Creation: An input-output connection is initiated by the output 14, that is, it is the output 14 that requests the connection. For example, a rendering output requests an input 12 to be rendered, and a remote client requests streaming of an input via the networking output. Likewise, a file writer output takes the initiative to request archiving or recording of a certain input.

Processing: Data Format. The processing block 116 accepts and deals with "samples", which are by definition network protocol independent, as well as independent from file formats. A sample is defined as "raw" uncompressed data, such as a video frame or ASCII text, but a sample can also be compressed data such as an MPEG-4 compressed video frame or an MP3 audio frame. As such the inputs and the outputs serve to deal with their respective details such as protocol translation and buffering, and generate (for the inputs) or accept (for the outputs) only samples. The inputs and outputs of the processing block 116 therefore deal with the notion of samples, as well as processing elements. For example, an encoder takes raw samples as input and produces encoded samples.

Input-Output Connection Realization: When an output 16 receives and issues a request for connection to an input, this request is passed on to the processing block 116. This processing block 116 then locates the input 12 that is requested.

The next step is to match a data format of the input 12 to an input format of the output 16. This may be performed by inserting needed processing elements, such as routing a network input through an appropriate decoder to a renderer output. Other connections may also be made.

Native Connection (see FIG. 6): The processing block 116 makes the connection between inputs 12 and outputs 16, requiring that all data be in the sample format. However, certain applications need only relay the data from input to output, for example, to fan-out the data to multiple clients, and to convert from the "native" input format to the same "native" output format via the sample format will be unnecessary and wasteful. Inputs 12 may therefore support a "native" format that can directly be connected to a peer output that supports this same native format. The output may therefore in certain situations request a direct native connection from the processing block 116, which, if available, will facilitate and make this connection.

The structure depicted in FIG. 2 shows one variation of a streaming engine 100. The streaming engine 100 may include, e.g., three input and three output types to accommodate a plurality of different scenarios using a same engine. The inputs 12 pass samples/frames to a middle, processing portion 14 while outputs accept samples/frames from the processing portion. As such, the middle portion 14 deals solely with samples/frames and is not encumbered with input and output data types. The middle portion 14 can be configured to produce any kind of output samples/frames, given available processing elements. A session, which connects inputs 12 to outputs 14, is initiated and/or created on the outputs 16. Single-user and multi-user sessions may include different features as will be explained in greater detail below. For example, a single-user session may provide Video-on-Demand, while a Multi-User session may provide live video. The engine 100 may provide multiple sessions at the same time. The engine 100 can define and add custom inputs, outputs, processing elements and sample types. An output 16 can directly be connected to an input by means of a "native connection" (see FIG. 6). This permits a by-pass of the middle portion 14 with the processing elements, which would normally need data to be in sample/frame format. In this way, a minimum-delay can be constructed.

The engine(s) pushes streaming data from the inputs 12 to the outputs 16. The threads all reside in the inputs and are never blocked. Outputs 16 may also have threads to perform certain operations such as render timing and output buffering, if needed. The middle processing elements in processing block 116 may also have threads if certain implementations warrant their use. All processing elements 116 and other components preferably provide minimum delay. Advantageously, the implementation in accordance with the present principles is platform independent (e.g, C/C++ programming may be employed), except for those parts such as a capture input, which would need to be platform dependent. Platform independence is achieved, e.g., by using the standard ANSII C/C++ programming language and standard extensions like Posix sockets. These standards are recognized on most platforms, such as the Apple™ MacOs™, Unix™, and Linux™. In case of a Windows™ platform, which sometimes has slightly different conventions, simple adaptations such as naming re-definitions are used that permit the standard language to compile and run on the Windows™ platform as well. Well-known techniques may be employed in dealing with Windows™ discrepancies with the standard programming language.

Referring to FIG. 3, a system 150 permits building and integrating multi-media streaming applications. The system 150 includes input modules (110-112) that convert the specifics of streaming, file reading, and capture into a generally defined internal sample format. Output modules (120-124) convert the internal sample format into output specifics of streaming, file writing, and rendering. An internal relay is provided from input to output using the connection block 116. The connection block 116 includes a resource management module 140 to control or manage the various modules of the connection block 116. An external interface, e.g., an application programming interface (API) 130 is employed in this embodiment to monitor and control the system 150. A portion of the API 130 includes a control and management module 132, which permits adjustment and control of the connection block 116 depending on present conditions or programmed functions. The control and management module 132 works with a rules, events and analysis handler 138. Handler 138 captures and processes events and reflects the same on the output stream. The handler 138 is responsive to occurrences or changes to the inputs or control features (output requests, and the like). Such changes are reported to the resource management module 140, and the control and management module 132 and changes may be implemented to the connection block 116. For example, the events may include a change to the input. When the input changes more or different encoders or decoders are brought on-line and the output may change accordingly. The handler 138 provides guidance to connections needed and connection block configurations depending on the present events and conditions.

In one illustrative example, an output stream (os) and an input stream (is) will be described. In this example, an output stream is built based on time: $os_1 = is_1$ from 1 PM to 2 PM, and $is_2$ from 2 PM to 3 PM. The handler 138 listens to events on the input stream(s) and creates an os. The input streams carry an activity event (such as, e.g., people talking, data stream quality, data density, etc.). Next, an output stream is built selecting the input stream with the event and resolving any conflicts with applicable rules (using handler 138). The input stream is analyzed and events are created that propagate to the output stream (motion, voice, etc.). A multi-stream rendition may be created from one stream with highlights (size, luminance) on the input stream with the event. In accordance with one rule set, time is compressed for the input stream, so that only when there is activity (e.g., video, audio, event) the output stream is rendered at higher "quality". Other scenarios are also contemplated.

Figure 4:
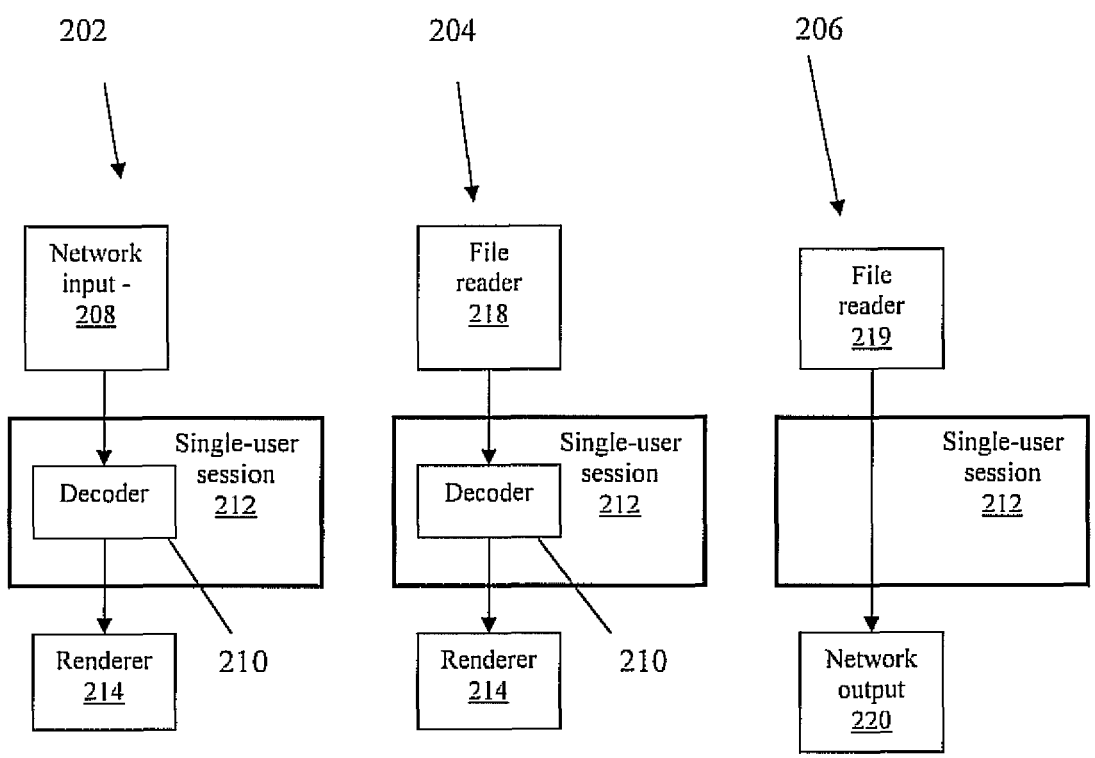
FIG. 4 is a block/flow diagram showing single user session possibilities in accordance with one illustrative embodiment.

Referring to FIG. 4, single user structures are illustratively shown for three types of single-user sessions 212. These include a first type 202 for rendering (playback) by a renderer 214 from a network 208, a second type 204 for rendering (playback) by a renderer 214 from a file 218, and a third type 206 serving a Video-On-Demand file 219 from a file system to a network 220. The examples in FIG. 4 do not show any format conversion (although format conversion may be provided), such as down-sampling video, changing bit rates, encoding format conversion (like MPEG-4 to H.264), etc. The single user sessions 212 for the first type 202 and the second type 204 are processed using a decoder 210. The decoder 210 is not needed in the third type 206.

Figure 5:
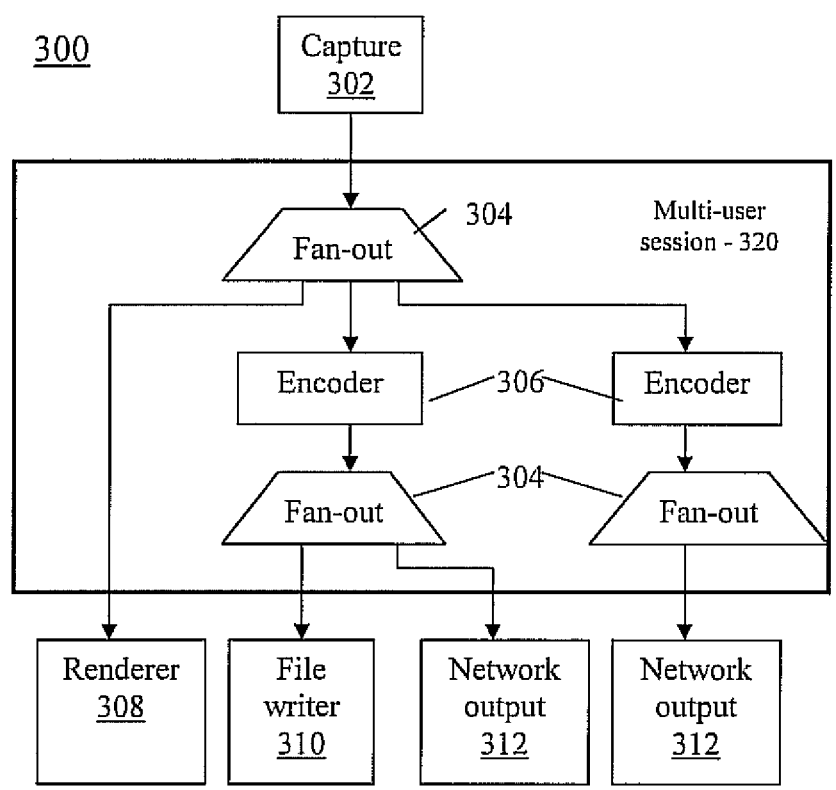
FIG. 5 is a block/flow diagram showing a multi-user session in accordance with one illustrative embodiment.

Referring to FIG. 5, an illustrative multi-user structure 300 is illustratively depicted. There are several input/output combinations possible with multi-user sessions 320. A capture input 302 is created, registered (because these are live streams), and requests for a connection have been honored from two network outputs 312, a renderer output 308, and a file writer 310 for recording. One difference between a single-user and multi-user session is that all processing elements as well as the input employ fan-outs 304 to permit multiple outputs to connect anywhere to any processing element. Processing elements 306 include encoders to encode streaming inputs, as needed.

Figure 6:
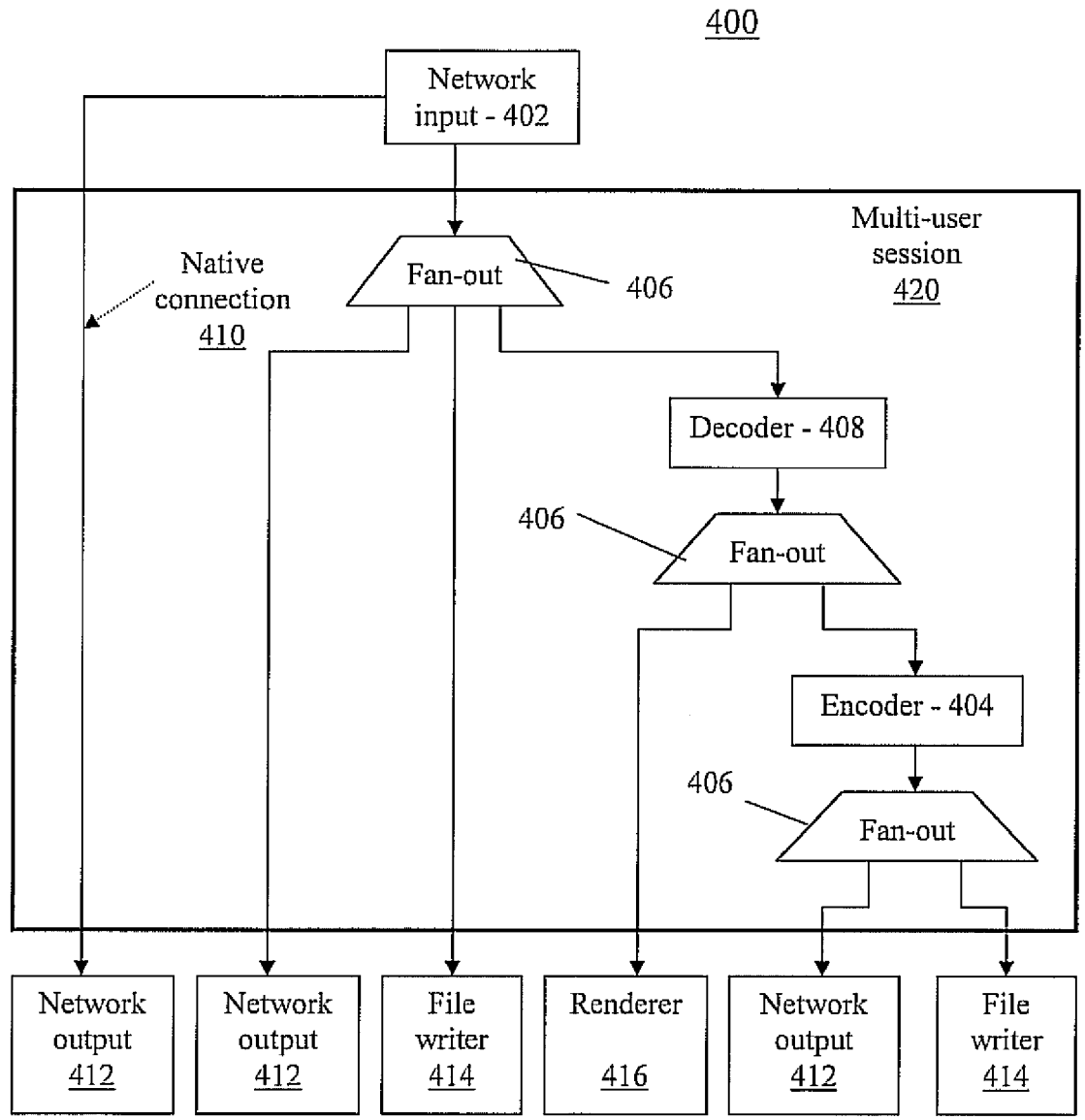
FIG. 6 is a block/flow diagram showing another multi-user session in accordance with another illustrative embodiment having a native connection.

Referring to FIG. 6, another example of a multi-user structure 400 is illustratively depicted. Structure 400 shows a native interface connection 410. Note that there is also a network output 414 that is directly connected to a network input fan-out 406. In this case, the native connection 410 is not used, because a protocol of a network input 402 and protocols of outputs are different, and a protocol translation is achieved by going through the multi-user session sample input/output format.

To permit multiple users to connect to the various streams within the multi-user session, either directly or via one or more processing elements 404, 408, the processing elements 404, 408 are followed by a fan-out 406 in a multi-user session. There is no restriction on the number and kind of processing elements 404, 408, and how they are interconnected. Three network outputs 412, a renderer output 416, and two file writers 414 for recording are provided. It should be understood that the inputs and outputs are completely flexible and can be configured to handle the most popular configurations. Further, the number and type of processing elements are also flexibly deployed to satisfy the input and output configuration(s).

In one embodiment, a push model is employed. This means that threads reside in the inputs. Threads may not be blocked anywhere. The number of threads is preferably kept to a minimum. Many modules such as encoders and decoders will be thread-less (or at least, the implementation does not expose them). The various active inputs contain the threads. This means that the inputs "push" the data into the connected processing elements and to the output modules that are in turn connected to those processing elements. The end points of the data are always the output modules (412, 414, 416), which means that the output modules take the data and move it out of the system in a manner that depends on the output module. For example, a file writer 414 will write the data to file, a renderer 416 will render the data on the screen, and a network output 412 will send the data over the network. Because multiple outputs can be connected via processing elements to a single input, an output should always accept and use the data immediately without waiting, i.e., without holding or blocking the thread.

The notion of sessions (420) is maintained in the various output module managers. When an output session is created, it is maintained by such a manager, so that it can be removed, cleaned up and deleted later by that same manager. Likewise, the processing elements (e.g., 404, 408) that connected the various inputs to the various output sessions may also be cleaned up and deleted by a manager when such processing elements are no longer needed.

Figure 7:
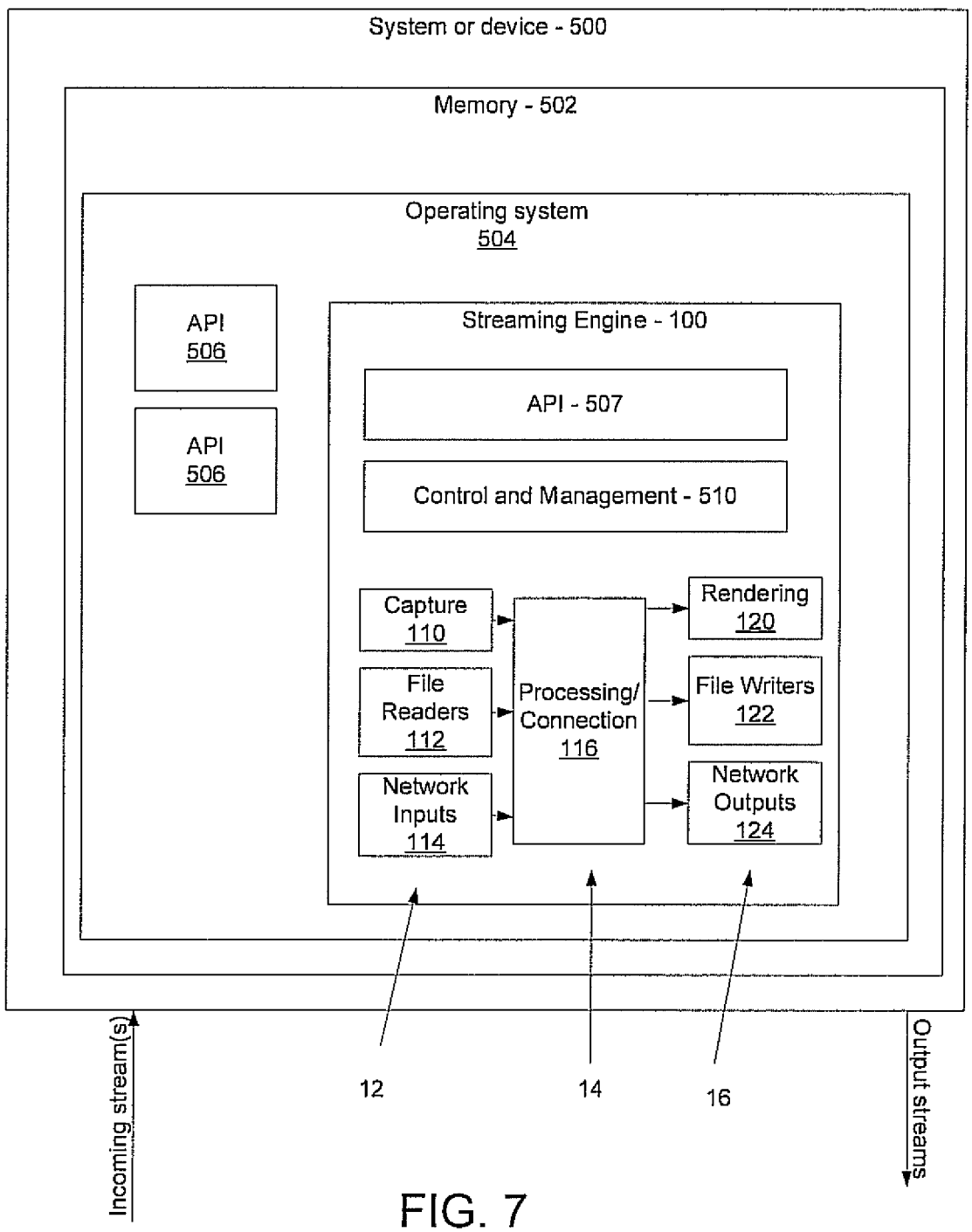
FIG. 7 is a block/flow diagram showing a system having a streaming engine in accordance with the present principles.

Referring to FIG. 7, a system or device 500 is illustratively depicted. System 500 may include a computer device, a cell phone, a personal digital assistant, a language translator, a portable television or any other device that receive streaming data. The system 500 includes memory 502 which includes an operating system 504. The operating system 504 enables the use of application programming interfaces (APIs) 506 which are employed in building, integrating, and maintaining applications. The system 500 may be networked to other devices (e.g., connected to a network, such as the Internet or a cable or satellite network). The system 500 is configured to receive and process video, audio, data or any other type of stream.

In accordance with the present principles, a streaming engine 100 (which may also include structures 150, 200, 300 and 400) in accordance with one preferred embodiment includes three inputs 12, three outputs 16 and a processing block or connection block 14. As before, the inputs 12 may include capture 110, file reader 112, network input 114. The outputs 16 may include rendering 120, file writer 122, and network output 124.

The inputs 12, outputs 16 and processing elements in processing block 116 can be configured as needed using control and management functions 510. Control and management 510 permits high level changes to the streaming engine 200, which may be either manual or automatic using an API 507. In this way, the API 507 may be employed to configure the streaming engine 100 from the top down at the higher application level, not at the lower streaming, signal processing level and component integration level. Further, time is reduced for application development, integration, debugging, maintenance, extending new formats and protocols, etc. In addition, the streaming engine 100 enables easier bridging between different formats and protocols.

Illustrative configurations may employ some of the inputs, outputs and processing elements. For example, a player application employs the rendering output 120, and the inputs include file readers 112 and network inputs 114. For an Internet protocol picture, the application uses the capture input 110 and employs rendering 120, file writers 122 and networks outputs 124. For a video on demand application, the application uses the file readers input 112 and employs the networks outputs 124. For a stream archiver application, the application uses the network inputs 114 and employs the file writer output 122. For a stream distribution and processing service, the application uses the network inputs 114 and networks outputs 124.

Figure 8:
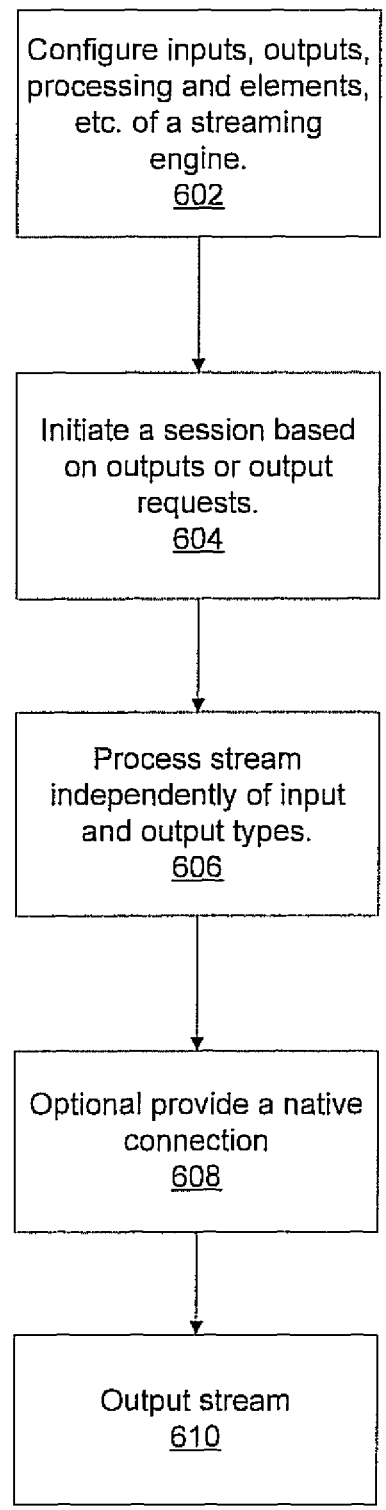
FIG. 8 is a flow diagram showing a method for integrating multi-media streaming applications on a computer device in accordance with the present principles.

Referring to FIG. 8, a method for integrating multi-media streaming applications on a computer device is illustratively depicted. In block 602, one or more of inputs, outputs, processing elements and sample types are configured for a streaming engine for a given application. In block 604, a session is initiated based on outputs or output requests for the streaming engine to determine connections between inputs and the outputs so that the samples and the frames are appropriately directed and/or processed. A plurality of sessions may be initiated at a same time. The sessions include one of a single user session and a multi-user session.

The samples and frames are processed independently of input and output types to produce any kind of output samples and frames in accordance with processing elements employed in a processing block, in block 606. The processing may include at least one of encoding and decoding the samples and frames. In block 608, a native connection is optionally provided (if needed) and configured to by-pass of the processing block. The stream from the streaming engine is output in block 608.

Having described preferred embodiments of an architecture for building multi-media streaming applications (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A streaming engine, comprising:
a plurality of input sources configured to pass samples from an input stream, wherein said samples are network protocols independent and independent from file formats;
a processing block including a processor configured to process the samples independently of input sources and output targets and produce any kind of output samples in accordance with one or more processing elements employed in the processing block, where each of said processing elements performs a processing function on the samples; and
a plurality of output modules configured to initiate a session which determines connections between inputs and outputs so that the samples are received from the processing block in accordance with the session to appropriately direct the stream.

2. The engine as recited in claim 1, wherein the processing block includes fan-out devices to distribute streams to a plurality of outputs.

3. The engine as recited in claim 1, wherein the session includes one of a single user session and a multi-user session.

4. The engine as recited in claim 3, wherein the single user session includes a video-on demand session and the multi-user session includes a live video session.

5. The engine as recited in claim 1, wherein the processing block includes a handler configured to be responsive to events to configure connections between inputs and outputs.

6. The engine as recited in claim 1, wherein the engine provides a plurality of sessions at a same time.

7. The engine as recited in claim 1, wherein the processing block includes at least one of an encoder and a decoder for processing the samples.

8. The engine as recited in claim 1, wherein the engine is configured in accordance with a control and management layer of an application programming interface such that inputs, outputs, processing elements and sample types are configurable.

9. The engine as recited in claim 1, further comprising a native connection configured as a by-pass of the processing block having streaming data from an input remain in its sample format.

10. The engine as recited in claim 1, further comprising threads residing in the inputs which are pushed to the outputs.

11. A device including a streaming engine stored in memory, comprising:
an application programming interface (API) stored in the memory and having a control and management layer for configuring and maintaining the streaming engine, the API being capable of configuring the streaming engine in accordance with a given application;
the streaming engine including:
a plurality of input sources configured to pass samples from an input stream, wherein said samples are network protocols independent and independent from file formats;
a processing block configured to process the samples independently of input sources and output targets and produce any kind of output samples in accordance with one or more processing elements employed in the processing block, where each of said processing elements performs a processing function on the samples; and
a plurality of output modules configured to initiate a session which determines connections between inputs and outputs so that the samples are received from the processing block in accordance with the session to appropriately direct the stream.

12. The device as recited in claim 11, wherein the processing block includes fan-out devices to distribute streams to a plurality of outputs.

13. The device as recited in claim 11, wherein the session includes one of a single user session and a multi-user session.

14. The engine as recited in claim 11, wherein the engine provides a plurality of sessions at a same time.

15. The device as recited in claim 11, wherein the processing block includes at least one of an encoder and a decoder for processing the samples.

16. The device as recited in claim 11, wherein the control and management layer configures inputs, outputs, processing elements and sample types.

17. The device as recited in claim 11, further comprising a native connection configured as a by-pass of the processing block having streaming data from an input remain in its sample format.

18. The device as recited in claim 11, further comprising threads residing in the inputs which are pushed to the outputs.

19. A method for integrating multi-media streaming applications on a computer device, comprising:
configuring one or more of inputs, outputs, processing elements and sample types for a streaming engine for a given application stored on a memory device;
initiating a session based on outputs of the streaming engine to determine connections between inputs and the outputs so that samples are appropriately directed; wherein said samples are network protocols independent and independent from file formats;
processing the samples independently of input sources and output modules to produce any kind of output samples in accordance with one or more processing elements employed in a processing block, where each of said processing elements performs a processing function on the samples; and
outputting a stream from the streaming engine.

20. The method as recited in claim 19, wherein the session includes one of a single user session and a multi-user session.

21. The method as recited in claim 19, wherein initiating includes initiating a plurality of sessions at a same time.

22. The method as recited in claim 19, wherein processing includes at least one of encoding and decoding the samples.

23. The method as recited in claim 19, further comprising providing a native connection configured to by-pass of the processing block.

24. A non-transitory computer readable storage medium comprising a computer readable program for integrating multi-media streaming applications, wherein the computer readable program when executed on a computer causes the computer to perform the steps of:
configuring one or more of such that inputs, outputs, processing elements and sample types for a streaming engine for a given application;
initiating a session based on outputs of the streaming engine to determine connections between inputs and the outputs so that samples are appropriately directed, wherein said samples are network protocols independent and independent from file formats;
processing the samples independently of input sources and output modules to produce any kind of output samples in accordance with one or more processing elements employed in a processing block, where each of said processing elements performs a processing function on the samples; and
outputting a stream from the streaming engine.

25. The computer readable storage medium as recited in claim 24, further comprising providing a native connection configured to by-pass of the processing block.

* * * * *